US 7,986,635 B2

(12) United States Patent
Kawamura

(10) Patent No.: US 7,986,635 B2
(45) Date of Patent: Jul. 26, 2011

(54) WIRELESS COMMUNICATION APPARATUS, COMMUNICATION CONTROL PROGRAM, AND COMMUNICATION CONTROL METHOD

(75) Inventor: Takuya Kawamura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1183 days.

(21) Appl. No.: 10/860,483

(22) Filed: Jun. 4, 2004

(65) Prior Publication Data

US 2004/0258032 A1    Dec. 23, 2004

(30) Foreign Application Priority Data

Jun. 9, 2003    (JP) .................................. 2003-164053

(51) Int. Cl.
*H04L 12/28* (2006.01)

(52) U.S. Cl. ........ 370/254; 370/453; 370/457; 370/463; 370/475; 455/418; 455/352

(58) Field of Classification Search .................. 370/254, 370/328, 349–350, 313, 443, 322, 341, 453, 370/457, 463, 475; 455/435.1, 435.2, 418, 455/352; 709/249–250

See application file for complete search history.

(56) References Cited

U.S. PATENT DOCUMENTS

| | | | | |
|---|---|---|---|---|
| 5,506,847 A * | 4/1996 | Shobatake | ..................... | 370/338 |
| 6,018,767 A * | 1/2000 | Fijolek et al. | ................. | 709/218 |
| 6,396,814 B1 * | 5/2002 | Iwamura et al. | .............. | 370/256 |
| 6,842,460 B1 * | 1/2005 | Olkkonen et al. | ............ | 370/465 |
| 7,096,030 B2 * | 8/2006 | Huomo | ...................... | 455/456.3 |
| 7,200,366 B2 * | 4/2007 | Kawamura et al. | ............ | 455/91 |
| 7,249,168 B1 * | 7/2007 | Ryder | ........................... | 709/220 |
| 7,421,266 B1 * | 9/2008 | Bruestle et al. | ............... | 455/411 |
| 7,516,206 B2 * | 4/2009 | Henseler et al. | .............. | 709/223 |
| 2003/0005157 A1 * | 1/2003 | Chung et al. | ................... | 709/245 |
| 2003/0212824 A1 * | 11/2003 | Yoshizawa et al. | .......... | 709/245 |
| 2004/0025050 A1 * | 2/2004 | Godwin et al. | ............... | 713/201 |
| 2004/0068653 A1 * | 4/2004 | Fascenda | ...................... | 713/168 |
| 2004/0203768 A1 * | 10/2004 | Ylitalo et al. | .............. | 455/435.1 |
| 2004/0203863 A1 * | 10/2004 | Huomo | ...................... | 455/456.1 |
| 2006/0019630 A1 * | 1/2006 | Sposato et al. | ................ | 455/406 |
| 2006/0173993 A1 * | 8/2006 | Henseler et al. | .............. | 709/224 |
| 2008/0005793 A1 * | 1/2008 | Wenig et al. | .................... | 726/22 |
| 2008/0229366 A1 * | 9/2008 | Musschebroeck et al. | ..... | 725/59 |
| 2008/0319922 A1 * | 12/2008 | Lawrence et al. | .......... | 705/36 R |
| 2010/0325701 A1 * | 12/2010 | Sun | ................................. | 726/4 |

FOREIGN PATENT DOCUMENTS

| | | |
|---|---|---|
| CN | 1430339 A | 7/2003 |
| JP | 2002-281041 | 9/2002 |

OTHER PUBLICATIONS

Automatic management of network security policy; J Burns, A Cheng, P Gurung, S Rajagopalan—2001.*

* cited by examiner

*Primary Examiner* — Salman Ahmed
(74) *Attorney, Agent, or Firm* — Oblon, Spivak, McClelland, Maier & Neustadt, L.L.P.

(57) ABSTRACT

A wireless communication apparatus wirelessly communicable with a plurality of communication devices including an identifier naming unit configured to give each of the plurality of communication devices at least one local identifiers allowed to be set optionally, a communication device management unit configured to associate the local identifier with a pre-assigned identifier to each of the plurality of communication devices, and to manage a relation between the plurality of communication devices with the local identifiers, and an identifier display control unit configured to control a display device to display the local identifier in place of the pre-assigned identifier as information specifying a currently wirelessly communicable communication device among the plurality of communication devices.

18 Claims, 8 Drawing Sheets

DEVICE MANAGEMENT TABLE

| DEVICE ADDRESS | FRIENDLY NAME | LOCAL NAME 1 | LOCAL NAME 2 | LOCAL NAME 3 | | LOCAL NAME n |
|---|---|---|---|---|---|---|
| | | | | | | |
| | | | | | | |
| | | | | | | |
| | | | | | | |
| | | | | | | |
| | | | | | | |

FIG. 3

| NEIGHBORING DEVICE INFORMATION | |
|---|---|
| FRIENDLY NAME | DEVICE ADDRESS |
| BLUETOOTH PC | 00:50:CD:11:12:34 |
| BLUETOOTH PC | 00:50:CD:11:FF:AB |
| 00:50:CD:11:11:11 | 00:50:CD:11:11:11 |
| | |
| | |

DISCOVER DEVICE — 6

FIG. 4

| NEIGHBORING DEVICE INFORMATION | | |
|---|---|---|
| LOCAL NAME | FRIENDLY NAME | DEVICE ADDRESS |
| | | |
| | | |
| | | |
| | | |
| | | |

DISCOVER DEVICE — 6

FIG. 5

DEVICE MANAGEMENT TABLE

| DEVICE ADDRESS | FRIENDLY NAME | LOCAL NAME |
|---|---|---|
| 00:03:17:AB:04:BA | NOTE PC1 | CONNECTION TESTING DEVICE |
| 00:03:17:AB:11:44 | 00:03:17:AB:11:44 | DEMONSTRATION MACHINE |
| 00:50:CD:11:12:34 | BLUETOOTH PC | |
| 00:50:CD:11:FF:AB | BLUETOOTH PC | |
| 00:50:CD:11:11:11 | 00:50:CD:11:11:11 | |
| | | |
| | | |

FIG. 6

DEVICE MANAGEMENT TABLE

| DEVICE ADDRESS | FRIENDLY NAME | LOCAL NAME |
|---|---|---|
| 00:03:17:AB:04:BA | NOTE PC1 | CONNECTION TESTING DEVICE |
| 00:03:17:AB:11:44 | 00:03:17:AB:11:44 | DEMONSTRATION MACHINE |
| 00:50:CD:11:12:34 | BLUETOOTH PC | MAIN PC |
| 00:50:CD:11:FF:AB | BLUETOOTH PC | SUB PC |
| 00:50:CD:11:11:11 | 00:50:CD:11:11:11 | MY MOBILE PHONE |
| | | |
| | | |

FIG. 7

NEIGHBORING DEVICE INFORMATION

| LOCAL NAME | FRIENDLY NAME | DEVICE ADDRESS |
|---|---|---|
| MAIN PC | BLUETOOTH PC | 00:50:CD:11:12:34 |
| SUB PC | BLUETOOTH PC | 00:50:CD:11:FF:AB |
| MY MOBILE PHONE | 00:50:CD:11:11:11 | 00:50:CD:11:11:11 |
| | | |
| | | |

DISCOVER DEVICE

FIG. 8

DEVICE MANAGEMENT TABLE

| DEVICE ADDRESS | FRIENDLY NAME | LOCAL NAME 1 | LOCAL NAME 2 | LOCAL NAME 3 | | LOCAL NAME n |
|---|---|---|---|---|---|---|
| | | | | | | |
| | | | | | | |
| | | | | | | |
| | | | | | | |
| | | | | | | |
| | | | | | | |
| | | | | | | |

FIG. 10

DEVICE MANAGEMENT TABLE

| DEVICE ADDRESS | FRIENDLY NAME | LOCAL NAME 1 | | LOCAL NAME 1 | |
|---|---|---|---|---|---|
| | | LOCAL NAME | ENVIRONMENT INFORMATION | LOCAL NAME | ENVIRONMENT INFORMATION |
| | | | | | |
| | | | | | |
| | | | | | |

FIG. 11

DEVICE MANAGEMENT TABLE

| DEVICE ADDRESS | FRIENDLY NAME | LOCAL NAME 1 | | LOCAL NAME 1 | |
| --- | --- | --- | --- | --- | --- |
| | | LOCAL NAME | ENVIRONMENT INFORMATION | LOCAL NAME | ENVIRONMENT INFORMATION |
| 00:50:CD:11:12:34 | BLUETOOTH PC | | | | |
| 00:50:CD:11:FF:AB | BLUETOOTH PC | | | | |
| 00:50:CD:11:11:11 | | MY MOBILE PHONE | HOME | | |

FIG. 12

DEVICE MANAGEMENT TABLE

| DEVICE ADDRESS | FRIENDLY NAME | LOCAL NAME 1 | | LOCAL NAME 1 | |
| --- | --- | --- | --- | --- | --- |
| | | LOCAL NAME | ENVIRONMENT INFORMATION | LOCAL NAME | ENVIRONMENT INFORMATION |
| 00:50:CD:11:12:34 | BLUETOOTH PC | | | | |
| 00:50:CD:11:FF:AB | BLUETOOTH PC | | | | |
| 00:50:CD:11:11:11 | | MY MOBILE PHONE | HOME | TOSHIBA TARO@ TOSHIBA R&D CENTER MOBILE PHONE | OFFICE |

WIRELESS COMMUNICATION APPARATUS, COMMUNICATION CONTROL PROGRAM, AND COMMUNICATION CONTROL METHOD

BACKGROUND OF THE INVENTION

1. Field of the Invention

The present invention relates to a wireless communication apparatus for performing wireless communication with a plurality of communication devices.

2. Background Art

Wireless devices, communication protocols and application models are defined by a specification of a wireless communication technique called "Bluetooth™" standardized by Bluetooth SIG (Special Interest Group).

A wireless communication apparatus conforming to the specification of Bluetooth can identify wireless devices individually by use of unique device addresses given to the wireless devices respectively. Each of the device addresses has a size of 48 bits. For example, the device address can be expressed in hexadecimal notation such as "00:50:CD:11:AB:1F".

The wireless communication apparatus can detect devices existing in the surroundings in accordance with a procedure of discovering a neighboring device defined in conformity with the specification of Bluetooth. These detected devices are identified by their device addresses respectively.

In consideration of the situation that each neighboring device is displayed to a user for recognition, the user may feel inconvenient because the device address is just a string of numerical values. In order to solve this problem, a method called "friendly name" is defined in the specification of Bluetooth.

A character string etc. allowed to be recognized by the user can be added as "friendly name" for each Bluetooth device. For example, a friendly name "Bluetooth PC" can be set for a device having a device address "00:50:CD:11:AB:1F". In the procedure of discovering a neighboring device in conformity with the specification of Bluetooth, friendly names can be acquired from all the neighboring devices respectively. As a result, the wireless communication apparatus can present the neighboring devices with the friendly names to the user.

For example, there is however a possibility that one friendly name may be set by two devices A and B accidentally because the friendly names must be set by the devices themselves. On the other hand, default friendly names are set in the wireless communication apparatus in advance. The friendly names of such devices remain as default friendly names until the user changes the friendly names. As described above, the possibility that one friendly name may be given to a plurality of devices can be conceived sufficiently. In such a case, the user will get confused when the user wants to recognize the neighboring devices. As a solution to this problem, the user may give unique local names to the recognized neighboring devices respectively and the unique local names are displayed instead of device addresses or friendly names so that the user can find intuitively kinds of communication devices existing in the surroundings (See JP2002-281041(kokai)).

Incidentally, a technique of giving an alias name instead of the name added to another device to make the user recognize a device easily is generally often used. For example, in Web browser software "Internet Explorer™ (IE)" installed in a personal computer having an operating system Windows® made by Microsoft® Corp., URL information of Web pages once searched by a registration operation ("Add Favorite") and default page titles set by a Web page generator can be stored. When Web page information registered by the Web browser software is displayed on default page titles, the user can identify Web pages. When the user selects a certain page title, the user can browse a Web page based on URL information associated with the page title. The user however can add an alias name to the Web page when it is difficult to identify the default page title. The Web browser software can display the registered Web page to the user on the basis of the alias name.

SUMMARY OF THE INVENTION

Problem that the Invention is to Solve

Although the method of "friendly name" is defined in the specification of Bluetooth, friendly names must be set by devices themselves.

If the user gives unique local names to recognized neighboring devices in addition to the friendly names, the devices can be identified easily. If nothing is done except that the local names are set to have one-to-one correspondence to device addresses, for example, the following evil effects will occur:

(1) When one device is used by a plurality of users, e.g., a local name added by Mr. A must be also used by Mr. B.

(2) Much labor is taken if different alias names are given to a device whenever the device is used, for example, for test experiment in the inside of an office and for presentation in the outside of the office.

Under such circumstances, an object of the invention is to provide a wireless communication apparatus formed so that a plurality of communication devices can be identified so as to be easy to understand.

Means for Solving the Problem

In order to solve the problem, the invention provides a wireless communication apparatus wirelessly communicable with a plurality of communication devices including an identifier naming unit configured to give each of the plurality of communication devices at least one local identifiers allowed to be set optionally, a communication device management unit configured to associate the local identifier with a pre-assigned identifier to each of the plurality of communication devices and to manage a relation between the plurality of communication devices with the local identifiers, and an identifier display control unit configured to control a display device to display the local identifier in place of the pre-assigned identifier as information specifying a currently wirelessly communicable communication device among the plurality of communication devices.

BRIEF DESCRIPTION OF THE DRAWINGS

The present invention may be more readily described with reference to the accompanying drawings:

FIG. 3 is a view showing a display example of the display portion 5 in the case where local names are not displayed;

FIG. 4 is a view showing a display example of the display portion 5 in the case where local names are displayed;

FIG. 5 is a view showing an example of a device management table;

FIG. 6 is a view showing an example in which local names are added to the device management table shown in FIG. 5 by use of a user interface;

FIG. 7 is a view showing a display example of the display portion;

FIG. 8 is a view showing a device management table according to a second embodiment of the invention;

FIG. 10 is a view showing a device management table in the third embodiment;

FIG. 11 is a view showing a device management table in the third embodiment;

FIG. 12 is a view showing a device management table in the third embodiment.

DETAILED DESCRIPTION OF THE PREFERRED EMBODIMENTS

Description will be made below specifically about a wireless communication apparatus according to the invention with reference to the drawings. As an example of the wireless communication apparatus, a Bluetooth communication apparatus performing wireless communication in the Bluetooth specification will be described below.

First Embodiment

Figure 1:
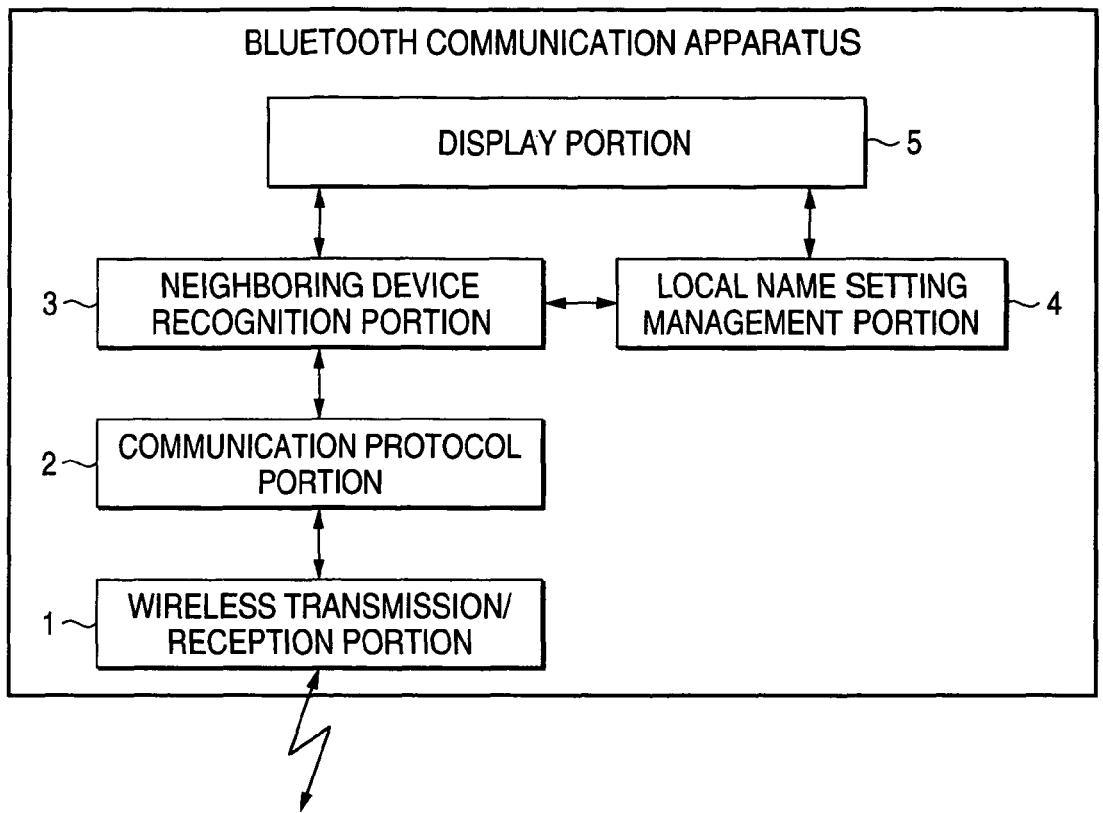
FIG. 1 is a block diagram showing the schematic configuration of a Bluetooth communication apparatus according a first embodiment of the invention.

FIG. 1 is a block diagram showing the schematic configuration of a Bluetooth communication apparatus according a first embodiment of the invention.

The Bluetooth communication apparatus shown in FIG. 1 includes a wireless transmission/reception portion 1 for making wireless communication in the Bluetooth specification, a communication protocol portion 2, a neighboring device recognition portion 3 for recognizing devices communicable in the Bluetooth specification, a local name setting management portion 4 for giving unique local names to the recognized devices respectively, and a display portion 5 for displaying the devices communicable in the Bluetooth specification. In FIG. 1, constituent members unrelated to the characteristic of the invention are omitted.

Figure 2:
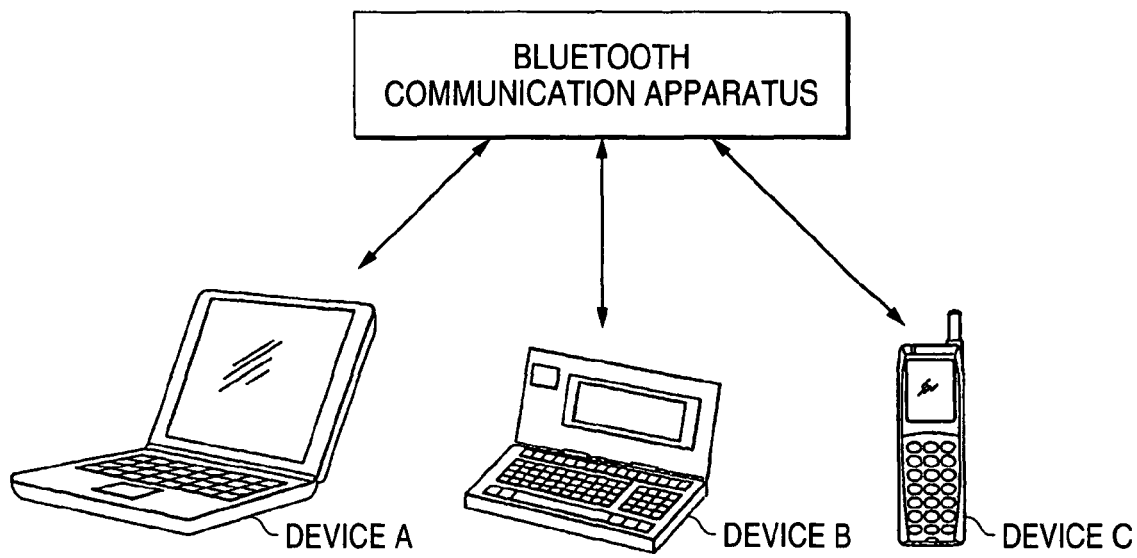
FIG. 2 shows the case where the Bluetooth communication apparatus depicted in FIG. 1 makes communication with three devices in a Bluetooth specification.

FIG. 2 shows the case where the Bluetooth communication apparatus depicted in FIG. 1 makes communication with three devices (that is, devices A, B and C) in the Bluetooth specification. The device address and friendly name of the device A are set as "00:50:CD:11:12:34" and "Bluetooth PC", respectively. The device address and friendly name of the device B are set as "00:50:CD:11:FF:AB" and "Bluetooth PC", respectively in the same manner as those of the device A. The device address of the device C is set as "00:50:CD:11:11:11" but the friendly name of the device C is not set.

The neighboring device recognition portion 3 uses the wireless transmission/reception portion 1 and the communication protocol portion 2 for performing a device discovering process defined in the Bluetooth specification. As a result, the neighboring device recognition portion 3 recognizes the presence of three neighboring devices and the device addresses of the devices, that is, "00:50:CD:11:12:34", "00:50:CD:11:FF:AB" and "00:50:CD:11:11:11".

In the neighboring device discovering process of Bluetooth, friendly names are acquired. As a result, it is recognized that "Bluetooth PC" is set for "00:50:CD:11:12:34", "Bluetooth PC" is set for "00:50:CD:11:FF:AB" and no friendly name is set for "00:50:CD:11:11:11". The recognized device addresses and friendly names are stored in the neighboring device recognition portion 3. Incidentally, the area for storing the device addresses and friendly names may be provided separately from the neighboring device recognition portion 3.

The display portion 5 cooperates with the neighboring device recognition portion 3 for displaying the device information stored in the neighboring device recognition portion 3.

FIG. 3 is a view showing a display example of the display portion 5 in the case where local names are not displayed. As shown in FIG. 3, a friendly name and a device name are displayed for each recognized device. Specifically, friendly names and device names of the devices A and B are displayed while a device address of the device C is displayed as its friendly name because the friendly name of the device C is not set.

Incidentally, in FIG. 3, a "Discover Device" button 6 is provided in a lower right corner of the screen. The button 6 serves as a trigger for performing a neighboring device discovering process. When a user pushes the button 6, the neighboring device recognition portion 3 executes the neighboring device discovering process and displays a result of the execution on the display portion 5.

For example, in a personal computer using Windows® of Microsoft® Corp. as an operating system (hereinafter abbreviated to as "OS"), FIG. 3 shows a graphical user interface (hereinafter abbreviated to as "GUI") for application software. An operation of pushing the "Discover Device" button 6 is equivalent to an operation of clicking a mouse in the condition that the cursor is placed on the "Discover Device" button 6 displayed on the screen.

On the other hand, FIG. 4 is a view showing a display example of the display portion 5 in the case where local names are displayed. As shown in FIG. 4, a local name set by the local name setting management portion 4, a friendly name and a device name are displayed in accordance with each recognized device.

When the "Discover Device" button 6 in the display portion 5 shown in FIG. 1 is pushed, the neighboring device recognition portion 3 uses the communication protocol portion 2 and the wireless transmission/reception portion 1 to execute the neighboring device discovering process of Bluetooth to thereby store and manage information about the device addresses and friendly names of the neighboring devices currently existing.

The neighboring device information stored and managed as a result of execution of the neighboring device discovering process is supplied to the local name setting management portion 4 by the neighboring device recognition portion 3. The local name setting management portion 4 has a device management table shown in FIG. 5 in its inside. As shown in FIG. 5, a device address, a friendly name and a local name for each neighboring device are registered on the device management table. The device address, friendly name and local name of each device already recognized by the neighboring device recognition portion 3 but not registered on the device management table yet are registered on the device management table.

FIG. 5 shows an example in which a local name "Connection Testing Device" is set for a device having a device address "00:03:17:AB:04:BA" and a friendly name "Note PC1" while a local name "Demonstration Machine" is set for a device having a device address "00:03:17:AB:11:44" and a friendly name the same as the device address.

The local name setting management portion 4 provides a user interface through which the user can give a local name as an arbitrary identifier to an arbitrary neighboring device. The local names set by the user using the user interface are reflected on the device management table.

For example, FIG. 6 shows an example in which local names are added into the device management table shown in FIG. 5 by use of the user interface. Specifically, a local name "Main PC" is added to a device having a device address "00:50:CD:11:12:34" and a friendly name "Bluetooth PC". A local name "Sub PC" is added to a device having a device address "00:50:CD:11:FF:AB" and a friendly name "Bluetooth PC". A local name "My Mobile phone" is added to a device having a device address "00:50:CD:11:11:11" and a friendly name the same as the device address.

Incidentally, a technique for making it possible to set local names on the screen of the display portion 5 may be used instead of the user interface provided in the local name setting management portion 4 for setting local names. In this case, the local names set on the screen of the display portion 5 may be supplied to the local name setting management portion 4 so that the local names can be managed by the local name setting management portion 4.

The local name setting management portion 4 supplies the local names to the display portion 5 while associating the local names with the device information recognized by the neighboring device recognition portion 3 and the information registered and managed on the device management table.

As shown in FIG. 7, the display portion 5 displays the local names, friendly names and device addresses given from the local name setting management portion 4.

When the user changes the local name "Main PC" to a new local name "Home PC" in the display state of FIG. 7, device address information corresponding to the new local name is input as changed information to the local name setting management portion 4 so that the device management table is updated.

FIG. 7 shows an example in which local names are set for all devices. For a device whose local name has not been set yet, a friendly name or a device name may be displayed as the local name of the device on the display area.

In this manner, in accordance with the first embodiment, unique local names, which are given to neighboring devices recognized as a result of wireless communication with the neighboring devices, are displayed on the display portion 5. Accordingly, it is easy to grasp kinds of the neighboring devices specifically.

Second Embodiment

A second embodiment of the invention shows the case where the function of the local name setting management portion 4 shown in FIG. 1 is expanded. A Bluetooth communication apparatus according to the second embodiment has the same block configuration as that in FIG. 1.

Description will be made below mainly on the different point of the Bluetooth communication apparatus according to the second embodiment from that shown in FIG. 1. The local name setting management portion 4 of the Bluetooth communication apparatus according to the second embodiment has a device management table of a data structure shown in FIG. 8. As is obvious from comparison with FIGS. 5 to 7, the device management table shown in FIG. 8 is formed so that a plurality of local names can be registered for one neighboring device.

To register a plurality of local names for each device, the local mane setting management portion 4 provides a user interface. Alternatively, there may be used a technique in which local names can be set on the screen of the display portion 5.

For example, assume that seven is the largest number of local names allowed to be stored and managed for one device by the local name setting management portion 4. In this case, the local name setting management portion 4 may be formed so that the oldest local name may be overwritten when the number of registered local names reaches seven but the user still desires to register a new local name.

The operation of the neighboring device recognition portion 3 is the same as that in the first embodiment. The local name setting management portion 4 supplies local names registered and managed on the device management table to the display portion 5 while associating the local names with device information given from the neighboring device recognition portion 3. When a plurality of local names for one device are stored in the local name setting management portion 4, the local name setting management portion 4 selects one from the local names and supplies the selected local name to the display portion 5.

There are four methods used in the local name setting management portion 4 for selecting one from the plurality of local names registered on the device management table and displaying the selected local name.

Method 1: Whenever local names are supplied to the display portion 5, the local name setting management portion 4 selects one local name quite at random from the local names.

Method 2: Whenever local names are supplied to the display portion 5, the local name setting management portion 4 selects one local name in such a predetermined sequence that the last local name in this sequence is selected and then the first local name in this sequence is selected again.

Method 3: One local name is first selected at random by Method 1 and supplied within a predetermined time after the selection but another local name is selected again at random when time-out occurs.

Method 4: One local name is selected in consideration of the sequence set by the Method 2 and supplied within a predetermined time after the selection but another local name is selected again in the sequence set by Method 2 when time-out occurs.

For example, assume that seven local names are set for one device. If the local name setting management portion 4 has a calendar function so that time information can be selected, different local names for a certain device can be displayed on the display portion 5 in accordance with days of a week.

If the local name setting management portion 4 is formed so that a specific date and time can be set together with a local name, a specific local name can be displayed on the display portion 5 at a specific date and time.

In this manner, in accordance with the second embodiment, a plurality of local names can be set for each neighboring device, so that a desired local name can be selected according to necessity.

Third Embodiment

A third embodiment of the invention shows the case where a desired local name can be selected in accordance with the environment.

Figure 9:
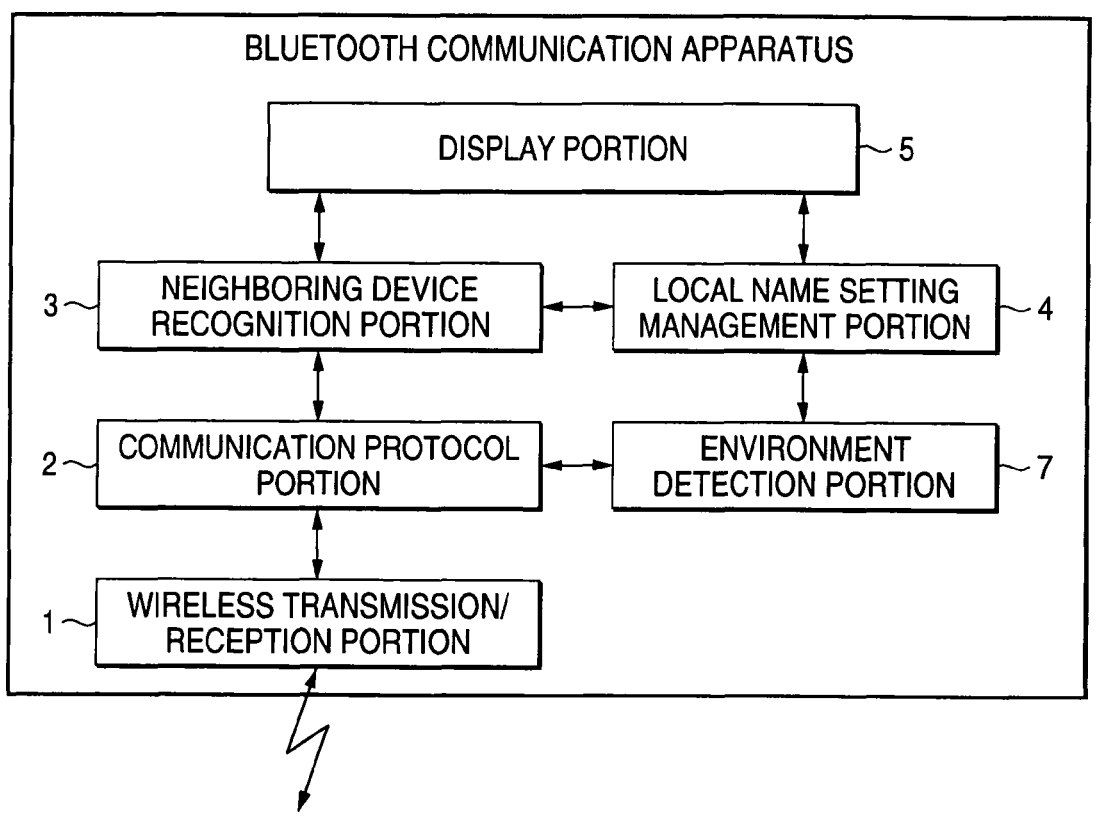
FIG. 9 is a block diagram showing the schematic configuration of a Bluetooth communication apparatus according to a third embodiment of the invention.

FIG. 9 is a block diagram showing the schematic configuration of a Bluetooth communication apparatus according to the third embodiment. The Bluetooth communication apparatus in FIG. 9 has a wireless transmission/reception portion 1, a communication protocol portion 2, a neighboring device recognition portion 3, a local name setting management portion 4, and a display portion 5, similarly to that in FIG. 1. In addition, the Bluetooth communication apparatus in FIG. 9 further has an environment detection portion 7.

The environment detection portion 7 has a function of detection an operative environment of the Bluetooth communication apparatus. As an example of the method for detecting the operative environment, an environmental difference can be judged from the user names currently logged in if the communication apparatus allows multi-users to log in by use of the OS "Windows" of Microsoft Corp.

When the communication protocol portion 2 has a function of setting an environment as a parameter, information about the environment can be detected by the communication protocol portion 2. For example, some apparatus has a function to set the environment of use into four modes, that is, "Office", "Mobile", "Home" and "Others".

When such an apparatus is used, the environment detection portion 7 may acquire mode information concerning "Office", "Mobile", "Home" and "Others" from the communication protocol portion 2 and use the mode information as the detected environment information. The environment detection portion 7 in the Bluetooth communication apparatus according to this embodiment acquires the environment information from the communication protocol portion 2.

The local name setting management portion 4 holds a device management table shown in FIG. 10 in its inside. When any device not registered on the device management table yet is contained in the neighboring device information already given from the neighboring device recognition portion 3, the local name setting management portion 4 registers this unregistered device on the device management table.

The device management table of the Bluetooth communication apparatus in FIG. 10 is different from the device management table of the Bluetooth communication apparatus described in the first and second embodiments. That is, various combinations of "Local Name" and "Environment Information" allowed to be set by the user uniquely can be stored at once on the device management table shown in FIG. 10 while "Local Name" and "Environment Information" are associated with each other.

The local name setting management portion 4 provides a user interface through which each user can set a plurality of "Local Names" at any time. By use of the user interface, the "Local Name" set by the user can be reflected on the device management table.

When a user sets a "Local Name", the local name setting management portion 4 sends an environment confirmation request to the environment detection portion 7. Upon reception of the environment confirmation request signal from the local name setting management portion 4, the environment detection portion 7 detects the current environment information and sends the detected environment information as an environment confirmation reply to the local name setting management portion 4.

Upon reception of the environment conformation reply, the local name setting management portion 4 registers the "Local Name" set by the user on the device management table while adding the environment information to the "Local Name". For Example, the environment detection portion 7 can detect "Office", "Mobile", "Home" and "Others" as the environment information. If the environment information detected by the environment detection portion 7 is "Home" when the user sets the "Local Name" as "My Mobile phone" for a device having the device address "00:50:CD:11:11:11", the device management table will be as shown in FIG. 11.

After several hours, if the environment information detected by the environment detection portion 7 is "Office" when the user sets the "Local Name" as "Toshiba Taro @ R&D Center Mobile phone" for the device having the same device address "00:50:CD:11:11:11", the device management table will be updated as shown in FIG. 12.

Incidentally, when the user sets the "Local Name", the local name setting management portion 4 need not immediately reflect the value of the local name on the device management table, that is, a place for temporarily storing the set "Local Name" may be provided separately from the device management table. In this case, the local name setting management portion 4 may be designed to operate as follows. That is, the local name setting management portion 4 first sends an environment confirmation request to the environment detection portion 7. After the local name setting management portion 4 receives an environment confirmation reply from the environment detection portion 7 and confirms the value of the environment information, the local name setting management portion 4 writes the "Local Name" previously stored in another place than the device management table and the environment information onto the device management table. In this case, when the same environment is present on the device management table, only the "Local Name" is overwritten. In this manner, when, for example, the user sets a "Local Name" of "My Mobile phone" in an environment "Home" and then changes the "Local Name" to "New Phone" in the same environment "Home", a plurality of "Local Names" having the same environment "Home" can be prevented from being registered on the device management table.

For setting a local name, the local name setting management portion 4 may provide a unique user interface or the local name may be input on the screen of the display portion 5.

When the user pushes the "Discover Device" button 6 displayed on the screen of the display portion 5, a neighboring device discovery start signal is sent to the neighboring device recognition portion 3. Upon reception of the neighboring device discovery start signal, the neighboring device recognition portion 3 executes a neighboring device discovering process of Bluetooth by using the communication protocol portion 2 and the wireless transmission/reception portion 1. As a result, information concerning device addresses and friendly names of devices currently exiting in the surroundings is stored and managed. The neighboring device recognition portion 3 operates so that the neighboring device information stored and managed as a result of execution of the neighboring device discovering process is supplied to the local name setting management portion 4.

Upon reception of the result of execution of the neighboring device discovering process from the neighboring device recognition portion 3, the local name setting management portion 4 confirms registration on the device management table and then sends an environment confirmation request to the environment detection portion 7. Upon reception of the environment confirmation request signal from the local name setting management portion 4, the environment detection portion 7 detects the current environment information and sends the detected environment information as an environment confirmation reply to the local name setting management portion 4.

Upon reception of the environment confirmation reply, the local name setting management portion 4 once stores the environment information as "Current Environment Information". Then, the local name setting management portion 4 supplies the display portion 5 with the device information given from the peripheral recognition portion 3 and "Local Name" information corresponding to the device among the information stored and managed on the device management table managed internally by the local name setting management portion 4. On this occasion, if any "Local Name" associated with the environment information "Current Environment Information" exists on the device management table managed by the local name setting management portion 4, the local name setting management portion 4 supplies the "Local Name" to the display portion 5.

For example, if the environment information "Home" is obtained from the environment detection portion 7 when the device management table managed by the local name setting management portion 4 is as shown in FIG. 12 in which the neighboring device recognition portion 3 informs the local name setting management portion 4 of discovery of only a device having the device address "00:50:CD:11:11:11" as a result of the neighboring device discovering process, the "Local Name" supplied to the display portion 5 is "My Mobile phone".

On the other hand, if the environment information "Others" is acquired from the environment detection portion 7, a friendly name or device address is supplied in place of the "Local Name" because there is no "Local Name" registered on the device management table so as to be associated with the "Environment Information".

As described above, according to the third embodiment, registration is made in the condition that environment information is added to local names. A local name suitable for the detected environment is selected automatically and displayed on the display portion 5. Accordingly, it is possible to display the local name suitable for the current environment, so that correspondence between environment and device can be grasped easily.

Fourth Embodiment

A fourth embodiment of the invention is a modification of the third embodiment and different from the third embodiment in environment information detected by the environment detection portion 7.

Figure 13:
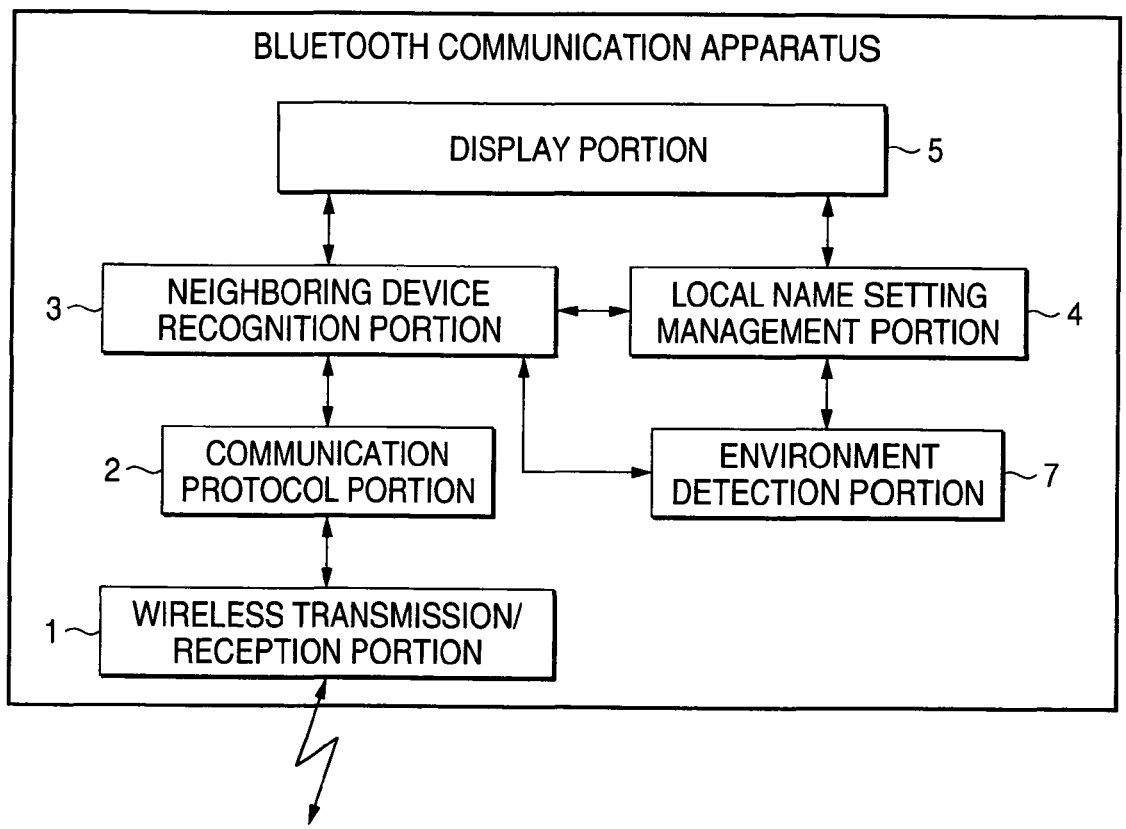
FIG. 13 is a block diagram showing the schematic configuration of a Bluetooth communication apparatus according to a fourth embodiment of the invention.

FIG. 13 is a block diagram showing the schematic configuration of a Bluetooth communication apparatus according to the fourth embodiment. The environment detection portion 7 in the Bluetooth communication apparatus shown in FIG. 13 detects an operative environment on the basis of a signal given from the neighboring device recognition portion 3.

The environment detection portion 7 according to this embodiment acquires information of devices currently existing in the surroundings on the basis of a result of recognition in the neighboring device recognition portion 3. When the environment detection portion 7 acquires the information of devices currently existing in the surroundings, the environment detection portion 7 judges from the acquired device information whether any device depending on the environment exists or not. When the environment detection portion 7 determines that a device exists, the device address of the device is added into the environment information.

The "device depending on the environment" means a device having a high possibility of fixed use without moving, such as a device depending on the environment include an access point, and a printer. In a neighboring device discovering process defined in the Bluetooth specification, the device attribute of the device can be detected as CoD (Class of Device). The environment detection portion 7 judges from the CoD whether the detected device is a device depending on the environment.

In the third embodiment, the specific "environment information" used in the environment detection portion 7 is classified into four values, namely, "Office", "Mobile", "Home" and "Others". On the other hand, in the forth embodiment, the environment detection portion 7 of the Bluetooth communication apparatus can take a plurality of values, not limited to four values because the "Environment Information" is a device address of each "Device Depending On Environment".

When the environment detection portion 7 receives the environment confirmation request signal from the local name setting management portion 4, the environment detection portion 7 detects current environment information and sends the detected environment information as an environment confirmation reply to the local name setting management portion 4. An example of the environment information included in the environment confirmation reply is a device address of the "Device Depending On Environment".

When the local name setting management portion 4 receives the environment confirmation reply, environment information including the device address of the device depending on the environment is added to a "Local Name" set by the user so that the environment information and the "Local Name" are registered on the device management table.

As described above, according to the fourth embodiment, a device depending on the environment is searched. While environment information about the searched device is associated with a unique local name, the environment information and the unique local name are registered on the device management table. Accordingly, it is possible to easily grasp which device currently exists in the surroundings.

Part of the wireless communication apparatus described in these embodiments may be made of hardware or software. When part of the wireless communication apparatus is made of software, a program for implementing at least a part of functions of the wireless communication apparatus may be stored in a recording medium such as a floppy disk or a CD-ROM so that the program can be read and executed by a computer. The recording medium is not limited to a portable medium such as a magnetic disk or an optical disk. The recording medium may be a stationary recording medium such as a hard disk unit or a memory.

The program for implementing at least a part of functions of the wireless communication apparatus may be distributed through a communication line (inclusive of wireless communication) such as the Internet. In addition, the program may be distributed in an encrypted, modulated or compressed state through a wire or wireless line such as the Internet or in the condition that the program is stored in a recording medium.

EFFECT OF THE INVENTION

As described above in detail, according to the invention, local identifiers different from one another are given to a plurality of communication devices respectively. The local identifiers of the devices are displayed on a display device, so that it is possible to intuitively and easily know kinds of communication devices existing in the surroundings. In addition, the identifiers corresponding to operative environments can be selected automatically and displayed on the display device. Accordingly, it is possible to easily grasp the devices associated with environments respectively.

What is claimed is:

1. A wireless communication apparatus wirelessly communicable with a plurality of communication devices, each communication device having a pre-assigned identifier, the apparatus comprising:

an identifier naming unit configured to present a user interface to a user at the wireless communication apparatus, the user interface allowing the user to set, for each communication device, a plurality of local identifiers, each local identifier being correlated with an environment;

an environment detection unit configured to detect a current operative environment of the wireless communication apparatus;

a communication device management unit configured
to associate, for each communication device, the local identifiers with the pre-assigned identifier, and
to manage a relation between each communication device with the local identifiers; and an identifier display control unit configured
to select, for each communication device, one of the respective local identifiers based on the current operative environment, and
to control a display device to display the selected local identifier in place of the pre-assigned identifier as information specifying a currently wirelessly communicable communication device among the plurality of communication devices,
wherein each of the plurality of local identifiers for a respective one of the plurality of communication devices corresponds to a different location of the respective communication device.

2. The wireless communication apparatus as claimed in claim 1,
wherein the plurality of local identifiers for one communication device are registered in the communication device management unit.

3. The wireless communication apparatus as claimed in claim 1,
wherein the environment detection unit detects an operating mode or information at authentication as the operative environment.

4. The wireless communication apparatus as claimed in claim 2,
wherein when a respective local identifier is registered, the communication device management unit associates the respective local identifier with information on the operative environment detected by the environment detection unit and registers the respective local identifier.

5. The wireless communication apparatus as claimed in claim 1,
wherein the environment detection unit detects whether any device depending on an environment exists or not; and
the communication device management unit associates a respective local identifier with information indicating whether each of the plurality of the communication devices depends on an environment or not, and registers the respective local identifier.

6. The wireless communication apparatus as claimed in claim 5,
wherein the wireless communication apparatus can make wireless communication with the plurality of communication devices in conformity with a Bluetooth specification; and
the environment detection unit detects an attribute of each of the plurality of communication devices on the basis of Class of Device (CoD).

7. The wireless communication apparatus as claimed in claim 1, wherein the wireless communication apparatus can make wireless communication with the plurality of communication devices in conformity with a Bluetooth specification; and
the pre-assigned identifier is at least one of a device address and a friendly name.

8. A non-transitory computer readable recording medium storing computer executable code to perform a communication control for causing a wireless communication apparatus wirelessly communicable with a plurality of communication devices, each communication device having a pre-assigned identifier, to execute an operation, comprising:

configuring an identifier naming unit to present a user interface to a user at the wireless communication apparatus, the user interface allowing the user to set, for each communication device, a plurality of local identifiers, each local identifier being correlated with an environment;

detecting a current operative environment of the wireless communication apparatus;

associating, for each communication device, the local identifiers with the pre-assigned identifier to each of the plurality of communication devices, registering the local identifier, and managing each the communication device with the local identifiers;

selecting, for each communication device, one of the respective local identifiers based on the current operative environment, and controlling a display device to display the selected local identifier in place of the pre-assigned identifier as information specifying a currently wirelessly communicable communication device among the plurality of communication devices, wherein each of the plurality of local identifiers for a respective one of the plurality of communication devices corresponds to a different location of the respective communication device.

9. The computer readable recording medium storing computer executable code to perform a wireless communication control as claimed in claim 8,
wherein the plurality of local identifiers for one communication device are registered.

10. The computer readable recording medium storing computer executable code to perform a wireless communication control as claimed in claim 8,
wherein an operating mode or information at authentication is detected as the operative environment.

11. The computer readable recording medium storing computer executable code to perform a wireless communication control as claimed in claim 9,
wherein when a respective local identifier is registered, the respective local identifier is associated with information on the operative environment and the respective local identifier is registered.

12. The computer readable recording medium storing computer executable code to perform a wireless communication control as claimed in claim 8,
wherein it is detected whether any device depending on an environment exists or not; and
a respective local identifier is associated with information indicating whether each of the plurality of the communication devices depends on an environment or not, and the respective local identifier is registered.

13. A communication control method for a wireless communication apparatus wirelessly communicable with a plurality of communication devices, each communication device having a pre-assigned identifier, the method comprising:

configuring an identifier naming unit to present a user interface to a user at the wireless communication apparatus, the user interface allowing the user to set, for each communication device, a plurality of local identifiers, each local identifier being correlated with an environment;

detecting a current operative environment of the wireless communication apparatus;

associating, for each communication device, the local identifiers with the pre-assigned identifier to each of the plurality of communication devices, registering the local identifier, and managing each the communication device with the local identifiers;

selecting, for each communication device, one of the respective local identifiers based on the current operative environment, and controlling a display device to display the selected local identifier in place of the pre-assigned identifier as information specifying a currently wirelessly communicable communication device among the plurality of communication devices, wherein each of the plurality of local identifiers for a respective one of the plurality of communication devices corresponds to a different location of the respective communication device.

14. The wireless communication control method as claimed in claim 13,
wherein the plurality of local identifiers for one communication device are registered.

15. The wireless communication control method as claimed in claim 13,
wherein an operating mode or information at authentication is detected as the operative environment.

16. The wireless communication control method as claimed in claim 13,
wherein when a respective local identifier is registered, the respective local identifier is associated with information on the operative environment and the respective local identifier is registered.

17. The wireless communication control method as claimed in claim 13,
wherein it is detected whether any device depending on an environment exists or not; and
a respective local identifier is associated with information indicating whether each of the plurality of the communication devices depends on an environment or not, and the respective local identifier is registered.

18. A wireless communication apparatus wirelessly communicable with a plurality of communication devices, each communication device having a pre-assigned identifier, the apparatus comprising:
an identifier naming unit configured to present a user interface to a user at the wireless communication apparatus, the user interface allowing the user to set, for each communication device, a plurality of local identifiers, each local identifier being correlated with an environment;
an environment detection unit configured to detect a current operative environment of the wireless communication apparatus;
a communication device management unit configured
to associate, for each communication device, the local identifiers with the pre-assigned identifier, and
to manage a relation between each communication device with the local identifiers; and
an identifier display control unit configured
to select, for each communication device, one of the respective local identifiers based on the current operative environment, and
to control a display device to display the selected local identifier in place of the pre-assigned identifier as information specifying a currently wirelessly communicable communication device among the plurality of communication devices,
wherein the plurality of local identifiers are generated independently of any settings on the wireless communication apparatus or on each of the plurality of communication devices.

* * * * *